(Model.)

S. E. MILLETT.
WIRE GATE.

No. 262,607. Patented Aug. 15, 1882.

Witnesses:
Sarah B. Munson
Jno Creme

Inventor:
Silas E. Millett.

UNITED STATES PATENT OFFICE.

SILAS E. MILLETT, OF MILLETT'S STATION, MICHIGAN.

WIRE GATE.

SPECIFICATION forming part of Letters Patent No. 262,607, dated August 15, 1882.

Application filed April 28, 1882. (Model.)

*To all whom it may concern:*

Be it known that I, SILAS E. MILLETT, a citizen of the United States, residing at Millett's Station, in the county of Eaton and State of Michigan, have invented a new and useful Wire Gate, more particularly designed for barbed-wire or strap fences, of which the following is a specification.

My invention relates to improvements in wire gates.

Figure 1:
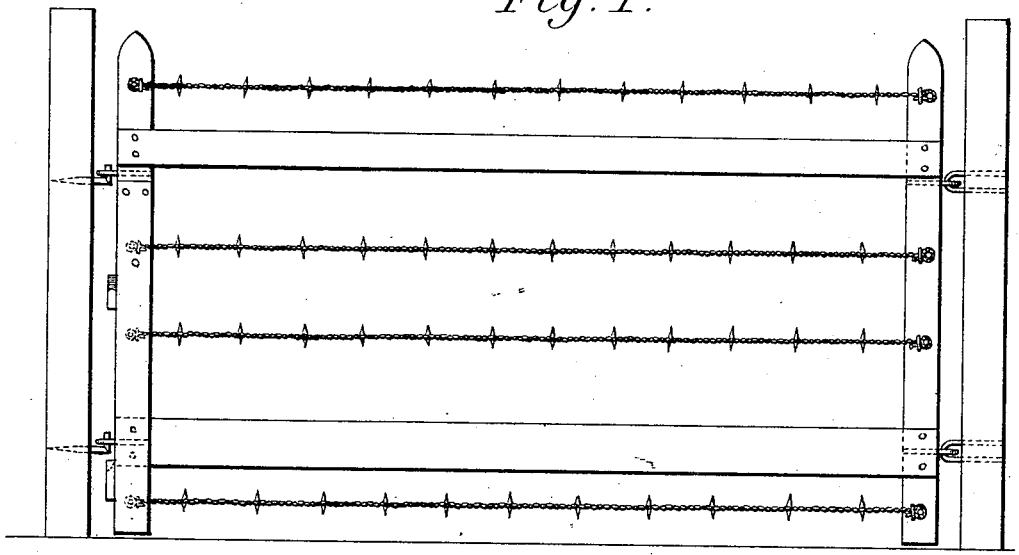
Figure 2:
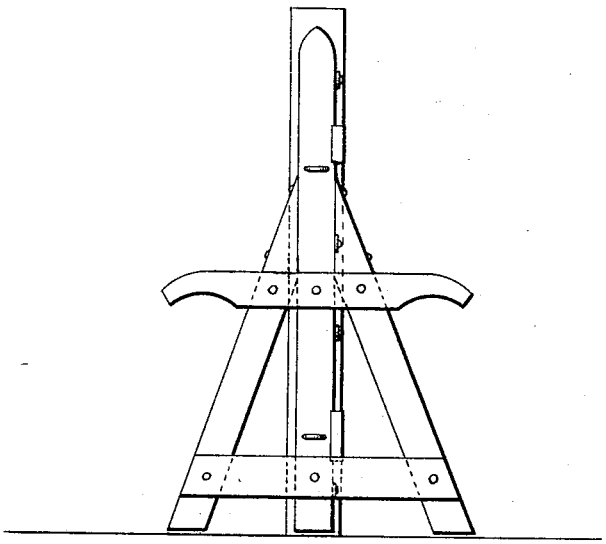

In the drawings, Figure 1 shows the body of the gate, and Fig 2 the brace applied to its forward end.

The gate is made of four or more strands of wire and two boards, $a\ a$, the length of the gate, to be made fast to the upright end pieces with nails and small staples. The lower board, one inch thick by eight inches wide, is placed between the two lower wires, and the upper board, one by four inches, between the two upper wires.

The forward end of the gate is supported on each side by an oblique bar, $b$, which is firmly attached to the end piece immediately below the upper board. These bars extend at right angles to the plane of the gate, their ends rest upon the ground, and they are stayed by a horizontal board, $c$, fastened to them and to the upright a little above their lower ends. A second horizontal board, $c'$, of the same length, is similarly fastened at a convenient height, and serves as a handle for the gate, its projecting ends being properly shaped for the purpose. This brace keeps the gate in an upright position when standing open, and makes it more durable by preventing the straining and breaking of nails from sagging and swerving. The addition of handle $c$ stays the brace and facilitates the opening and closing of the gate, and prevents the barbs on the wires from wounding the hands and tearing the clothes. Interlocking staples of half-inch round iron are used for the hinges, and similar staples on the forward end, engaging with hooks of the same iron, driven into the fence-post, serve for latches. The front end rests on the ground while standing open.

What I claim, and desire to secure by Letters Patent, is—

1. A gate supported at the forward end by an A-shaped brace at right angles thereto, substantially as described.

2. A gate supported at the forward end by an A-shaped brace at right angles thereto, the brace being further strengthened by a second horizontal bar near its top, which serves for a handle, substantially as described.

S. E. MILLETT.

Witnesses:
 JNO. CRANE,
 C. M. MCGEE.